United States Patent [19]

Betts et al.

[11] Patent Number: 4,751,911
[45] Date of Patent: Jun. 21, 1988

[54] PORTABLE WARMING OVEN

[76] Inventors: Trueman R. Betts, 4952 Rolling Meadows Rd., Rolling Hills Estates, Calif. 90274; Louis E. Gates, Jr., 31817 Langspur Ct., Westlake Village, Calif. 91361

[21] Appl. No.: 5,462

[22] Filed: Jan. 16, 1987

[51] Int. Cl.[4] ............................................. A47G 23/04
[52] U.S. Cl. ...................................... 126/261; 126/43; 126/50; 126/265; 126/266
[58] Field of Search ..................... 126/9 R, 261–266, 126/38, 43, 50, 9 B, 45, 47, 48, 49; 431/298, 319

[56] References Cited

U.S. PATENT DOCUMENTS

| 530,146 | 12/1894 | White | 126/266 |
| 1,102,796 | 7/1914 | Phillips | 126/265 |
| 2,123,031 | 7/1938 | Weiner | 126/261 |
| 2,575,299 | 11/1951 | Scheel | 126/266 |
| 2,973,756 | 3/1961 | Tyler | 126/266 |
| 3,978,782 | 9/1976 | Werling | 126/265 |
| 4,167,175 | 9/1979 | Malafouris | 126/9 R |
| 4,191,160 | 3/1980 | Elliot | 126/9 R |
| 4,526,158 | 7/1985 | Lee | 126/9 R |

FOREIGN PATENT DOCUMENTS 517315  1/1940  United Kingdom ............... 126/265

Primary Examiner—James C. Yeung
Attorney, Agent, or Firm—Cushman, Darby & Cushman

[57] ABSTRACT

A food warming oven has a wire rack frame surrounded by an insulation fabric cover which acts to retain heat within the oven, yet breathes to prevent moisture buildup in the heat retention volume. A flame producing device is disposed within the oven to provided a flame heat source. A heat distribution plate is disposed above the flame to insure a uniform heat distribution throughout the heat retention volume. A retention apparatus insures that the heat source is reliably and securely retained with the oven.

23 Claims, 4 Drawing Sheets

PORTABLE WARMING OVEN

BACKGROUND OF THE INVENTION

The present invention relates to a portable oven for warming food products. The warming oven is constructed of light-weight, inexpensive materials yet provides an efficient food warmer which may be operated in a convenient manner by persons of limited skill. More particularly, the present invention relates to a portable warming oven having a wire rack frame assembly surrounded by a flexible heat insulation material, and a flame producing device for generating heat within the oven.

In the food delivery field, many devices are known for keeping the "product warm during delivery. Such known devices include insulated containers for surrounding a preheated food product to keep it warm for a short period of time. However, these devices are benign and without a heat source to keep the food warm. Such devices are unacceptable for food products which are not preheated, or food products requiring a long delivery time. In addition, such known devices are constructed so as to prevent heat leakage through the joints, seams, and closure edges. A preheated food product placed in such a device quickly generates a substantial amount of humidity inside the container, thus degrading the quality of the food product contained therein. For example, food products containing pastry crusts such as pizza tend to get soggy and unpalatable because the chamber is tightly sealed and does not breath.

Other known food warming devices include ovenlight carriers that have self-contained, fueled heat sources. One such device is disclosed in U.S. Pat. No. 2,057,373 to Dukes. The Dukes portable oven includes an alcohol burner located within a rigid and solid oven structure. Shelves are provided on the interior of the oven to hold a food product which is to be warmed. However, it can be appreciated that the apparatus according to Dukes is large, heavy, bulky, expensive to manufacture, and extremely awkward to carry and maneuver. Thus, the Dukes portable oven is not well adapted to home delivery of heated food products, such as pizza. In addition, there is no apparatus for insuring that the heat generated by the alcohol burner is evenly distributed within the oven. Thus, food within the Dukes portable oven may be unevenly heated, perhaps causing scorching of the food product itself.

Another known food heating apparatus is disclosed in U.S. Pat. No. 3,590,802 to Fried. The food warmer of Fried includes a rigid, solid oven structure having a front-opening door and wire racks horizontally disposed therein. However, the food warmer of Fried is connected to the heating system of an automobile to provide heat to the interior of the food warmer. Obviously, such a structure is far from portable and requires a great deal of time and expense to couple to an automobile heating system. It can be appreciated that malfunctions in the automobile heating system will cause a malfunction in the food warming oven, and vice-versa. In addition, the rigid structure according to Fried is extremely heavy, bulky, and cannot be carried or maneuvered once installed in the automobile. The wire racks of Fried are hollow and adapted to receive the heated fluid from the automobile heating system. This evidently provides a uniform heat distribution, but does not permit the vertical adjustment of the wire rack shelves themselves.

Another portable oven is disclosed in U.S. Pat. No. 3,724,440 to Clark et al in which a wire framework is coupled to a pair of rigid side panels. Heat is provided by gas or electric means, which greatly reduces the portability of the oven itself. A disposable oven covering made of aluminum may be wrapped around the wire framework to prevent ambient air currents from affecting the cooking process. However, it is evident that the Clark oven is only portable in the non-heating state. The oven must be connected to a gas or electric source before heating can be accomplished. In addition, the apparatus according to Clark et al is also heavy, expensive, and impossible to carry or maneuver once coupled to a heat source. Furthermore, the apparatus according to Clark et al contains no means to insure the even distribution of heat within the oven itself. Thus, the food product heated within the Clark oven may be heated unevenly.

Other food warming devices are described in the following U.S. patents: U.S. Pat. No. 3,288,129 to Fox; U.S. Pat. No. 4,424,798 to Volk; U.S. Pat. No. 1,545,393 to Bryant; U.S. Pat. No. 2,575,299 to Scheel; U.S. Pat. No. 2,371,410 to Rickenbacher; U.S. Pat. No. 3,074,394 to Witt; U.S. Pat. No. 3,874,361 to Parrinello; U.S. Pat. No. 2,742,850 to LaFond; and U.S. Pat. No. 4,384,513 to Pierick. Each of these food warming devices contains disadvantages which make them inappropriate to a light-weight food warming apparatus which may conveniently yet reliably heat a food product in a uniform fashion.

SUMMARY OF THE INVENTION

The present invention is intended to overcome the difficulties and disadvantages of known food warming devices, described above. The present invention provides a light-weight food warming oven by the inclusion of a wire rack frame which is light-weight yet sturdy and capable of supporting a wide variety of food products within the oven. Surrounding the wire rack frame is a breathable insulation cover which may include a breathable fabric outer shell, a foam insulation material bonded to the inside of the outer shell, and a breathable fabric bonded inside of the foam insulation. The insulation cover preferably has at least one vent therein to further assist the escape of moisture from the oven to prevent humidity buildup within the oven. The vent opening in the insulation cover may also be used to provide a handle by which the oven may be carried. The insulation cover also may include a zippered or otherwise fastened front door to allow easy access to the inside of the oven.

Inside the oven is disposed a source of heat, preferably a flame producing fuel cell capable of providing long-term heat to the oven interior. Above the heat source is disposed a heat distribution plate for insuring uniform heat distribution within the oven. The heat source may be disposed upon a second plate which both supports the heat source and conducts heat away from the heat source to insure reliable operation thereof. Preferably, a retention device is coupled between the bottom plate and the heat source to insure that the heat source remains stably mounted on the bottom plate.

The oven apparatus may also include a plastic base member within which the oven sits. The plastic base member insures structural stability, provides protection to the oven, and retains any spilled food or fuel within the oven itself. In one embodiment, the plastic base member comprises the second plate upon which the heat source is located.

Thus, the present invention provides a light-weight, self-contained, heat-generating, food warming oven which is inexpensive to manufacture, easy to assemble, and simple to use.

BRIEF DESCRIPTION OF THE DRAWINGS

The advantageous features of the present invention may be more fully appreciated from the following detailed description of the presently preferred exemplary embodiment when taken together with the attached drawings in which.

DETAILED DESCRIPTION OF THE PRESENTLY PREFERRED EXEMPLARY EMBODIMENT

Figure 1:
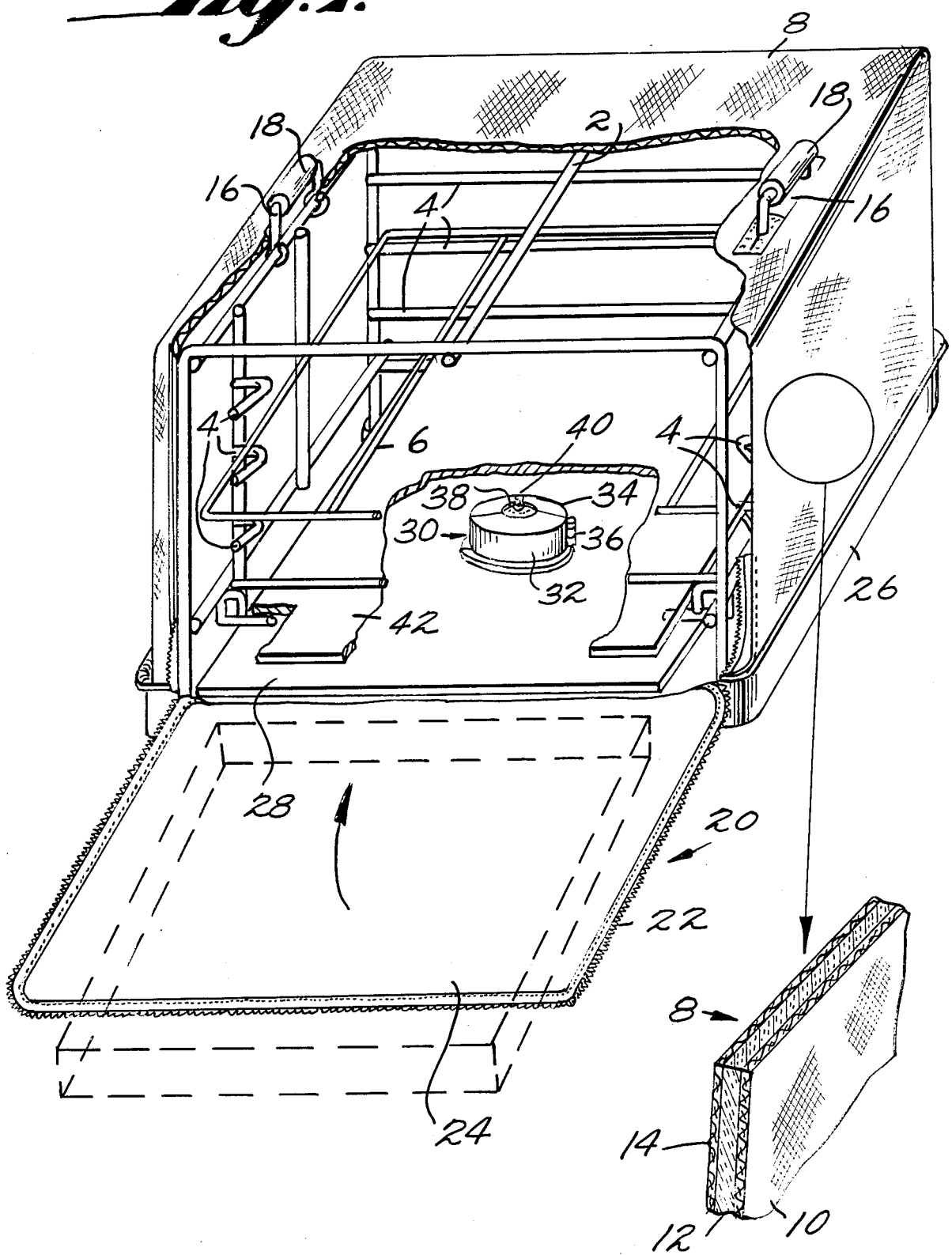
FIG. 1 is a partial, cross-sectional, perspective view of a preferred embodiment.

In general terms, the present invention comprises a formed plastic or metal base to which is secured a wire rack with shelves or compartments therein to receive the product. Surrounding the wire rack in an insulated fabric shroud or cover that is readily removable to permit access to the product, yet conveniently and easily replaced at will. The shroud serves to enclose the wire rack and its food contents, thereby acting as a heat retainer. In addition, the shroud acts to prevent air currents from cooling the contents of the food warmer. At an appropriate location on top of the wire rack is coupled at least one handle that passes up through a slitted vent opening in the topmost panel of the shroud. Provision is also made in the base for securing a fuel cell containing a slowburning fuel which is supplied to a burning wick. Above the flame, and forming a floor for a lowermost product compartment, is a one or two layered metal plate which serves to distribute heat uniformly beneath the food carrying compartment.

To secure the fuel can inside the apparatus, a rigid plate of heat resistant material is located at the bottom of the oven. The fuel can sits on top of this plate which conducts heat away from the fuel can to insure efficient operation thereof. Surrounding the fuel can is a retention device to hold the fuel can in place while permitting its wick assembly to pass therethrough. Preferably, a cup-shaped structure is coupled to the bottom plate and surrounds the fuel can. A hole in the center of the cup-shaped member allows the wick stem to protrude therethrough. The cup comprises two parts, one of which is hinged at one end and secured with a spring clasp at the same hinged end. The other part of the cup-shaped portion is fixed to the bottom plate. The fuel can is inserted by opening the hinged portion, inserting the fuel can, and then allowing the hinged portion to close against the stationary portion. The bottom plate upon which the fuel can sits may further be provided with rings or lugs to further insure that the fuel can is stably supported within the structure directly below the heat distribution plate. The heat distribution plate may be hinged at one end thereof so that the operator may have easier access to the interior of the device for fuel can replacement or removal.

As generally described above, the principle advantages of the present invention lie in its simplicity of manufacture and operation, its lightweight construction, its ready portability, the safety and convenience of use by persons of nominal skill, the provision of a self-contained heat source, uniform heat distribution throughout the food product compartments, the venting of heat through the vent openings and the fabric cover itself to reduce moisture retention, and its adaptability to a great variety of different food products. The heat source (preferably a fuel can with a wick) is readily and easily replaceable. The fuel can is secured safely in the oven to eliminate fire hazards should the oven be upset.

Turning now to FIG. 1, a more specific description of the present invention will be provided. The food warming oven includes a wire rack assembly 2 having a plurality of horizontal and vertical members capable of structurally supporting the remainder of the apparatus and the enclosed food products. For example, as depicted in FIG. 1 the wire rack assembly includes eight vertical support members and at least four horizontal support members all arranged in a cubical configuration. Those have ordinary skill in this field will readily understand that many different wire rack configurations may be used within the scope of the present invention. The chief requirement for the wire rack assembly is that it be light-weight yet readily able to support the remainder of the apparatus and the food products carried therein.

Affixed to the wire rack assembly 2 are a plurality of horizontal support members 4 and 5. Horizontal support members 4 are adapted to support horizontal shelves 6 or, in the alternative support the food products themselves. For example, a food tray by itself may be supported by horizontal support members 4 and 5. It is envisioned that shelves 6 be removable so that a wide variety of food products may be inserted in the oven. However, those of ordinary skill in this field will readily understand that a wide variety of wire rack/shelf configurations may be used with the present invention.

Surrounding wire rack assembly 2 is insulated cover 8. Insulated cover 8 should be flexible and light-weight to realize the portability advantages of the present invention. Preferably, insulation cover 8 includes an outer breathable fabric shell 10, which may comprise Cordura (TM) nylon which is breathable yet rugged. To the inside of outer shell 10 may be bonded an insulation layer 12. Preferably, insulation layer 12 comprises a foam insulation material which may be chemically-bonded or heatbonded to the outer shell 10. However, it is not required that insulation layer 12 be bonded to outer shell 10, so long as these two layers allow heat retention within the oven and breathability through the insulation cover. In the preferred embodiment, an inner fabric layer 14 is then bonded to the inside of insulation layer 12. This inner layer 14 may comprise a light-weight nylon which readily repels food stains, yet allows the passage of moisture vapor therethrough. Thus, the entire insulation layer 8 breathes to allow moisture to escape therethrough while retaining a substantial amount of heat within the oven itself.

As a further aid to breathability, vent openings 16 are provided at the top of insulation cover 8. Vent openings 16 may include a slit opening in insulation cover 8 with a flap covering selected portions of the slit opening. Preferably, the flap is affixed to the insulation cover 8 with a Velcro (TM) attachment. However, those of ordinary skill in this field will readily understand that the number and location of vent openings 16 may be varied depending upon the particular for which the oven is designed.

In the preferred embodiment, handles 18 are affixed to wire rack assembly 2 and extend upward through vent openings 16. Thus, vent opening 16 perform the dual function of venting the interior of the oven and providing access to fix handles 18 to wire rack frame assembly 2. Again, the location of the handles may be varied depending on use.

In order to provide access to the interior of the oven, insulation cover 8 is preferably provided with a zippered door 20. Zippered door 20 includes a zipper 22 affixed to the periphery of the door, and a panel 24. Preferably, panel 24 comprises the same material as the remainder of the insulated cover 8. However, those of ordinary skill in this field will readily understand that a wide variety of doors and closure mechanisms may be provided in the food warming oven. It is thought that the zippered door 20 provides a most convenient yet heat retentive door to the food warming oven. Velcro (TM) closures for the door are an alternative method.

At the bottom of the food warming oven is affixed a base 26. Base 26 acts to provide structural integrity and ruggedness to the oven. In addition, base 26 may be constructed in a ribbed configuration to provide further heat insulation qualities. Also, base 26 may act to retain any spilled food product or spilled fuel within the oven itself. Thus, a tipped-over oven will not produce an uncontrollable fire hazard. The configuration of base 26 will be described later in connection with FIGS. 3 and 4.

Inside the oven is a bottom plate 28 which is affixed to both the base 26 and the wire rack frame assembly 2. Bottom plate 28 preferably is made of a material with heat conduction qualities which can also provide rigid structural support. The bottom plate supports the heat source and also acts to carry excess heat away from the heat source container to prevent undesirable volatilization of liquid fuel therein.

Upon bottom plate 28 a retention device 30 is affixed. Retention device 30 is used to secure a heat source to bottom plate 28. As shown in FIG. 1, retention device 30 is a cup-shaped member having a hole 38 at the top thereof. A fuel can (not shown in FIG. 1) is contained within the cup-shaped structure. The fuel can supports a flame 40 which protrudes through hole 38. Retention device 30 is preferably split down the middle with a fixed half 34 and an articulatable half 32. A hinge and spring mechanism 36 acts to bias the articulatable half 32 toward the stationary half 34. To place a heat source within retention device 30, it is merely necessary for the operator to manually open the articulatable portion 32, insert the fuel can in stationary portion 34, and then permit articulatable half 32 to be closed against stationary half 34. Then, the operator merely lights the wick to provide heat from flame 40.

Above retention device 30 is a heat distribution plate 42. Heat distribution plate 42 is preferably made of a material having high heat transfer qualities. Preferably, a metallic plate is provided as the heat distribution plate. The function of heat distribution plate 42 is to evenly distribute the heat produced by flame 40 throughout the interior of the oven. Those of ordinary skill in this field understand that providing a substantially uniform temperature throughout all areas of the heat retention volume is important in providing uniformly heated food products. To this end, heat distribution plate 42 may be positioned so that small clearances exist between the periphery of heat distribution plate 42 and the interior of insulated cover 8. These clearances allow heat to pass upward from below the heat distribution plate around the four vertical walls of the oven. In addition, the heat produced by flame 40 will be evenly distributed along heat distribution plate 42 and will radiate upward therefrom toward the food products.

In order to provide a more evenly distributed heat to the interior of the oven, a second heat distribution plate may be provided a short distance above and parallel to heat distribution plate 42. The air gap between the two heat distribution plates acts to provide an extremely uniform temperature to the topmost heat distribution plate. Preferably, the retention device 30 and flame 40 are positioned so that heat is provided at substantially the center of heat distribution plate 42. In such a fashion, a most even and uniform heat is provided throughout the heat retention volume. It should also be noted that the heat distribution plate 42 may also serve as a bottommost shelf for supporting the food products.

Thus, as shown in FIG. 1, the present invention provides a convenient yet light-weight food warming oven having a self-contained heat source, a breathable structure, which is safe yet convenient to use.

Figure 2:
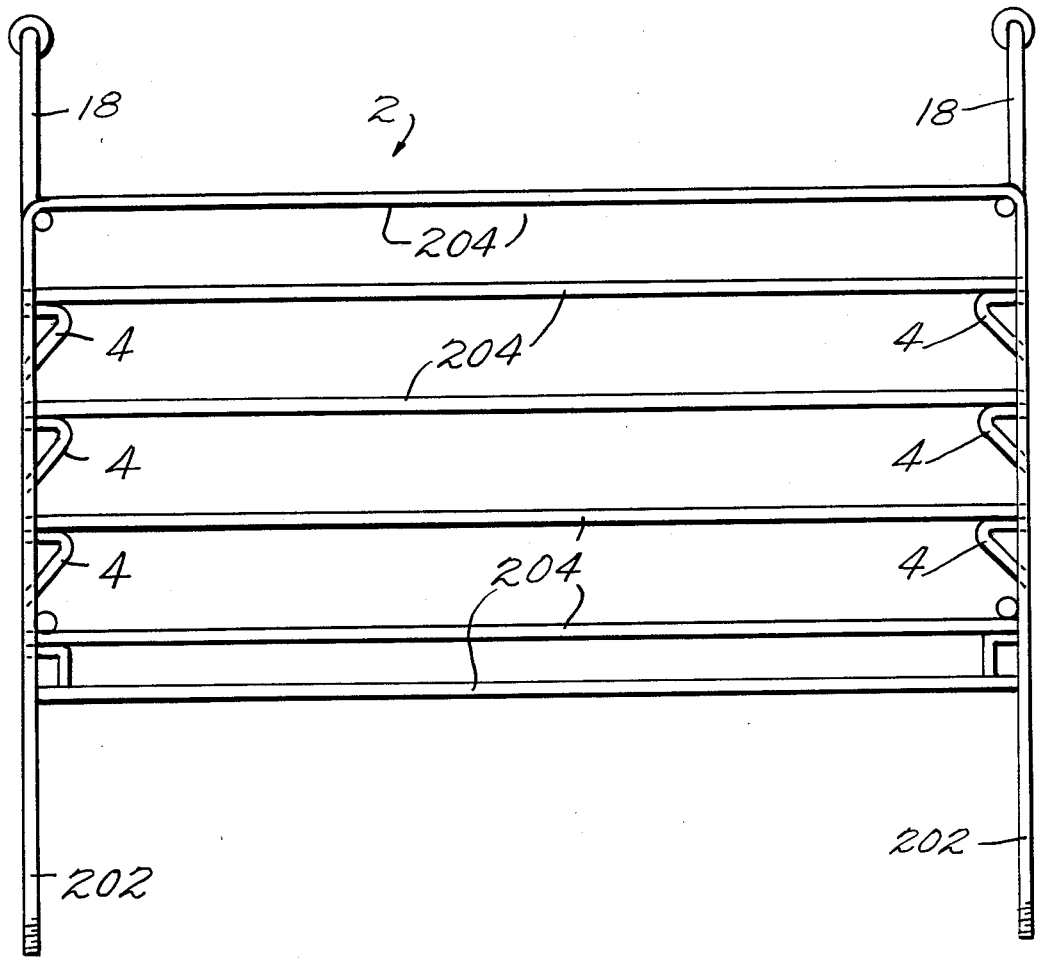
FIG. 2 is a side elevation of the wire rack assembly of FIG. 1.

FIG. 2 is a side elevation view of wire rack assembly 2. The wire rack assembly 2 is shown as including handles 18, and horizontal support member 4. Preferably, wire rack assembly 2 includes vertical support members 202 which may be threaded at their bottommost ends. These threaded ends may pass through holes bored in bottom plate 28, and extend into base 26. Below base 26, fixing means may be provided to secure the threaded ends of vertical supports 202. FIG. 2 also depicts the wire rack assembly as having a plurality of horizontal support members 204. The horizontal support members are used to provide structural rigidity to the wire rack frame 2. Those having skill in this field will readily understand that the exact configuration of wire rack assembly 2 may be varied depending upon the use for which the oven is designed.

Figure 3:
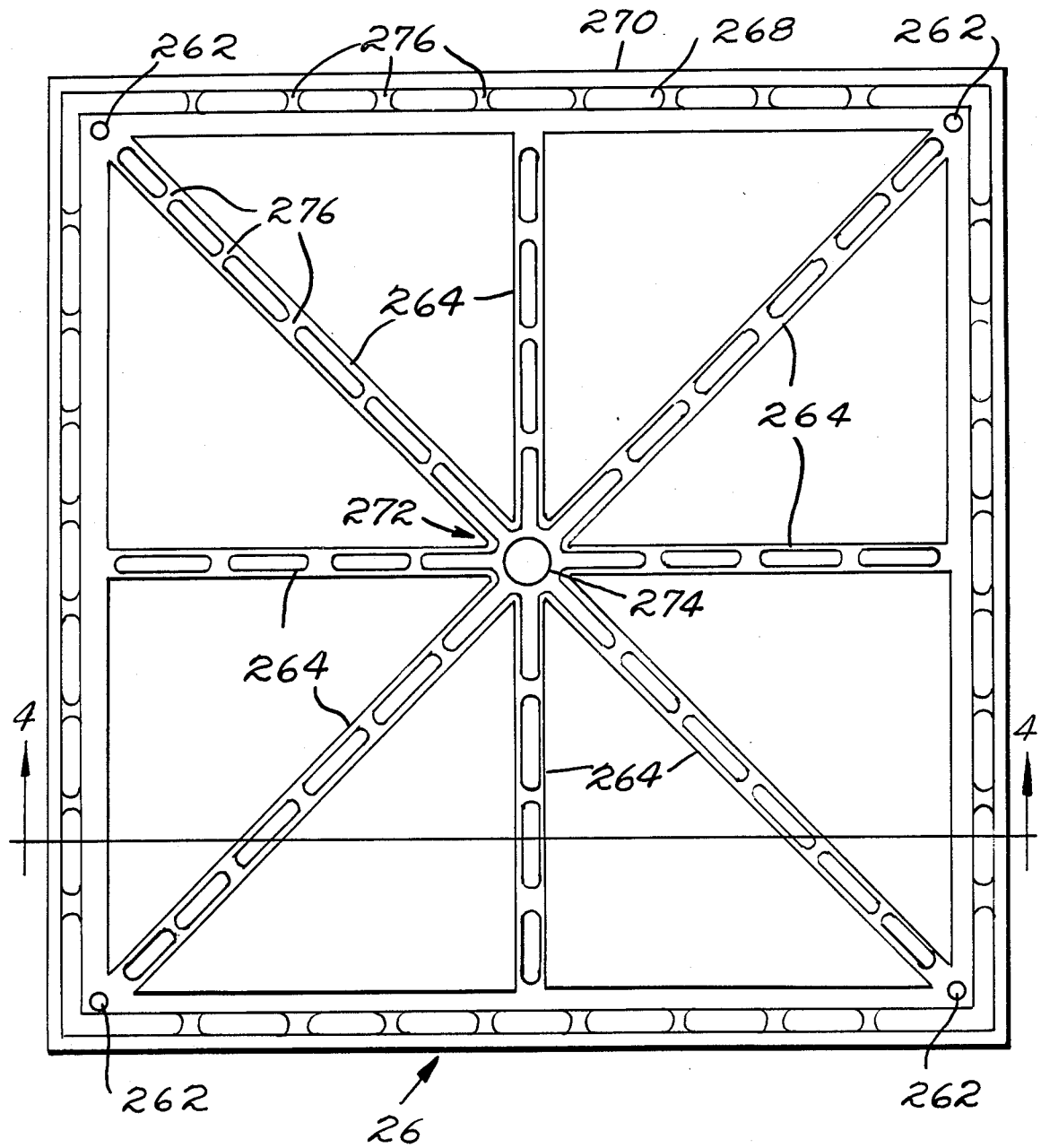
FIG. 3 is a plan view of the plastic base of FIG. 1.

FIG. 3 is a plan view of base 26. Preferably, base 26 is made of a heat resistant yet rugged material to withstand the bumps and bruises to which the oven will be subject. Base 26 should also be made of a flame resistant material so that any spillage or leakage of fuel will be retained within base 26 without igniting it. A rugged lightweight plastic is the preferred material for base 26.

Base 26 has holes 262 located at the corners thereof. The threaded ends of vertical support structures 202 may be inserted into holes 262 to secure wire rack frame assembly 2 to base 26.

Figure 4:
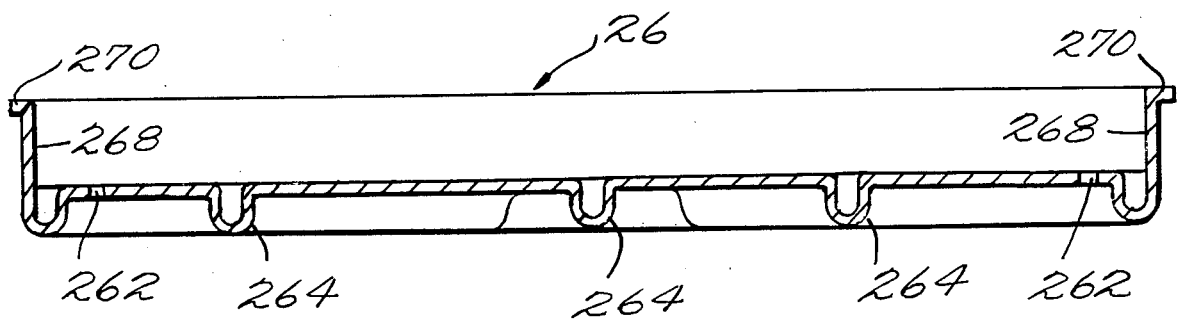
FIG. 4 is a cross-sectional view of the FIG. 3 base taken along line 4—4.

As graphically depicted in FIG. 3, base 26 may include a plurality of ridges and ribs to further enhance the heat insulation qualities of the oven. Specifically, ribs 264 (see also FIG. 4) are provided at the bottom of base 26 to contact the surface upon which the oven sits. Thus, conduction heat losses from the oven to the surface may be reduced. In addition, those having skill in this field will understand that the ribs 264 provide further structural strength to the base 26. As shown in FIGS. 3 and 4, base 26 may include four upturned edges 268. Upturned edges 268 may have outward facing lips 270. The upturned edges and lips act to further protect the bottom of the oven, and to retain any food product or fuel spilled within the interior of the oven. Also since wire rack frame assembly 2 is coupled directly to base 26 and handles 18, the structural integrity of the entire oven is quite good.

In an alternative embodiment, bottom plate 28 is not included in the oven and instead the fuel can and retaining device 30 are mounted directly upon base 26. In this alternative embodiment, base 26 has no cutouts between ribs. It also includes a central portion 272 which is adapted for mounting of retaining device 30 and the fuel can. In this alternative embodiment, base 26 will still act to conduct heat away from the fuel can, although heat removal will not be as efficient as if a metallic bottom plate is provided.

Also depicted in FIG. 3, ribs 264 and upturned edges 268 may include a plurality of webs 276 to further enhance the structural strength of the base 26. Those having skill in this field will understand that many different configurations of base 26 may be adapted to a food warming oven.

Figure 5:
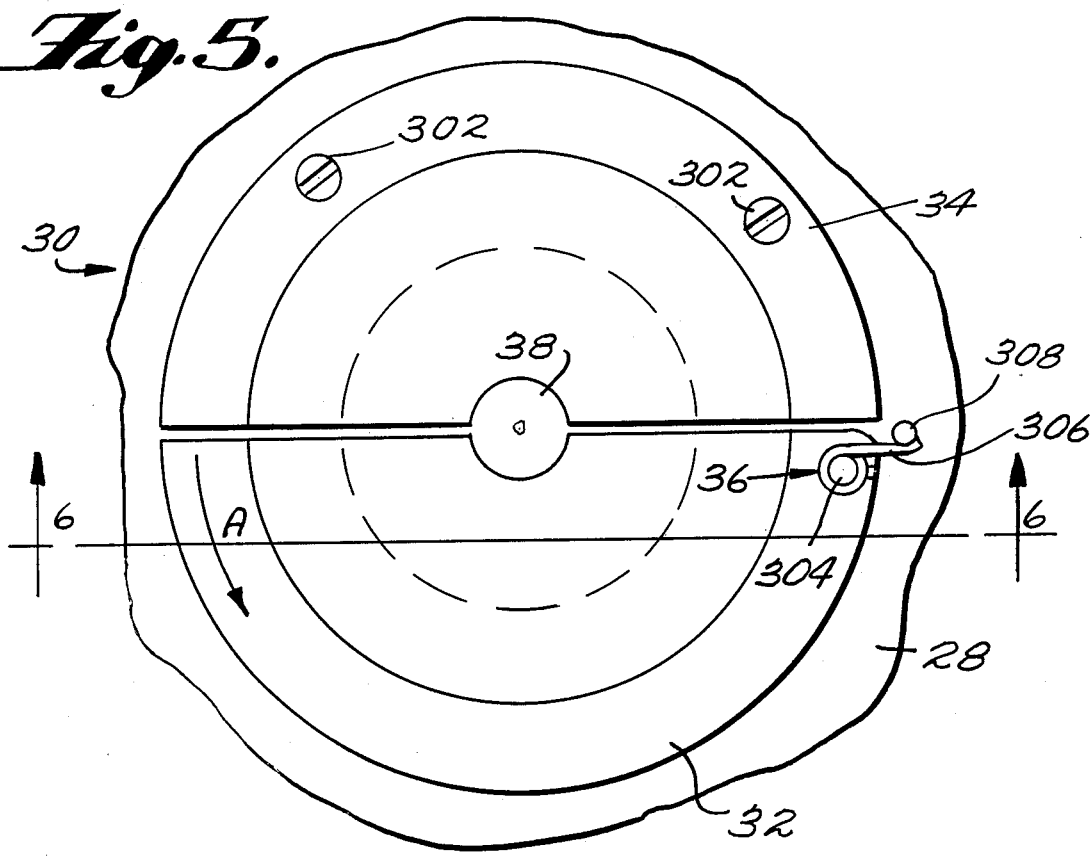
FIG. 5 is a plan view of the retention device for retaining the heat source, as depicted in FIG. 1.

FIG. 5 is a plan view of retention device 30 which is affixed to bottom plate 28 or alternatively, to base 26. Retention device 30 may be cut in half to provide articulatable portion 32 and fixed portion 34. Fixed portion 34 is affixed to plate 28 with fixing devices 302 (such as screws). Hinge mechanism 36 may include a hinge pin 304 to which articulatable portion 32 is rotatably mounted. Hinge device 36 may also include a spring 306 which is affixed to hinge pin 304. Spring legs 308 abut articulatable portion 32 and fixed portion 34. As articulatable portion 32 is rotated in the direction of arrow A, spring 306 acts to bias the articulatable portion 32 in a direction opposite arrow A. Thus, after the fuel source has been inserted inside retention device 30, articulatable portion 32 is biased to a closed position and securely holds the fuel can within retention device 30.

Figure 6:
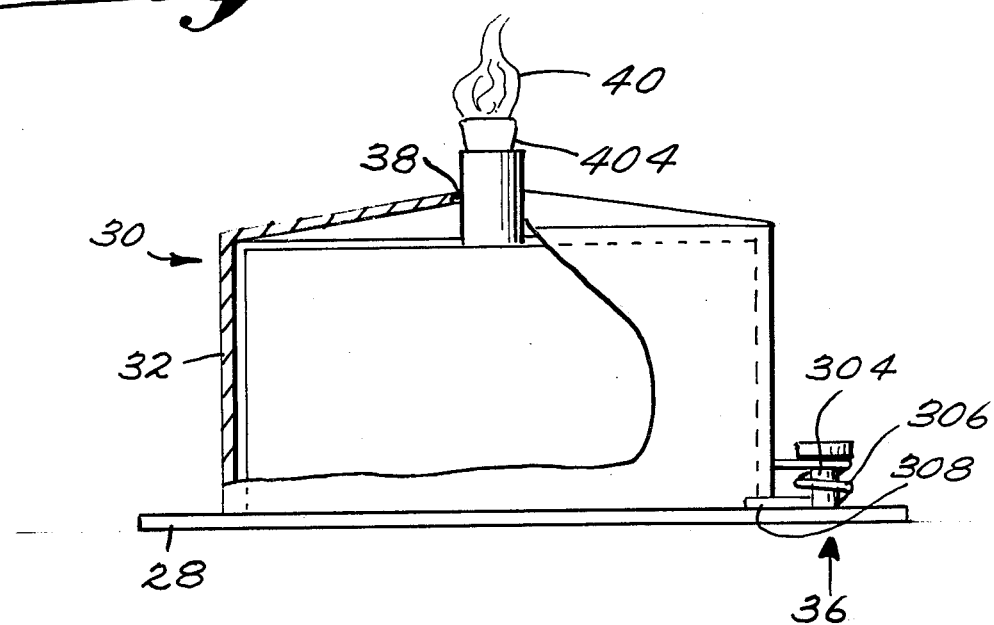
FIG. 6 is a partial cross-sectional view of the retention device, taken along line 6—6 of FIG. 5.

FIG. 6 shows a fuel can 402 mounted within the detention device 30. Fuel can 402 may be any known and convenient heat source which can provide a steady low-level heat for keeping the food warm inside the oven. Fuel can 402 may be dimensioned so that its outer edges abut the walls of retention device 30. It should be apparent to those of ordinary skill in this field that many different devices and structures may be used to temporarily fix the heat source to the bottom of the oven. For example, resilient bands may be used to hold the fuel can to the bottom plate. Also, rings tangs, screws, slots, tabs, clips, and even Velcro TM may be used to attach the heat source to the bottom of the oven. All such known and equivalent retention devices are to be included within the scope of the appended claims. Additionally, the person of ordinary skill in this field understands that many different hinge devices may be used with respect to articulatable portion 32. Again, all known and equivalent hinge/biasing structures are to be included within the scope of the following claims.

As depicted in FIG. 6, fuel can 402 includes a stem 404 and wick 406 which protrude from the top portion thereof. Wick 406 acts to cause fuel from the interior of fuel can 402 to migrate up wick 404 into the burning region of flame 40. Flame 40 protrudes through hole 38 in the retention device 30 to provide heat to heat distribution plate 42.

Thus, what has been described is a lightweight, easy-to-use, economical, portable food warming oven. One can readily imagine the ease with which a food delivery service may carry, stack, and store the food warming oven. The zippered front door allows easy access to the interior of the oven, while the insulation cover provides a light-weight yet breathable heat retention shell. A fuel can may be easily inserted into the retention device and thereafter securely retained inside the oven. The heat produced by the flame of the heat source is evenly distributed throughout the interior of the oven to insure uniform heating of the food product. The base provides a rugged, abrasion-resistant support for the oven which also acts as a safety mechanism to retain spilled fuel and food within the oven. In addition, many other advantages of the present structure may be readily imagined by those of skill in this field.

While the present invention has been described in connection with what is presently considered to be the most practical and preferred embodiments, it is to be understood that the invention is not to be limited to the disclosed embodiments only. On the contrary, the claimed invention is intended to cover various modifications and equivalent arrangements ascertainable by those of skill in this field. The scope of the appended claims is to be accorded the broadest interpretation so as to encompass all such modifications and equivalent structures.

What is claimed is:

1. Food warming apparatus, comprising:
   a wire rack frame;
   insulation means, surrounding said frame, for retaining heat within said apparatus;
   flame producing means, disposed within said apparatus, for providing a flame heat source;
   support means, disposed at a bottom of said apparatus, for supporting said flame producing means;
   heat distribution means, disposed within said apparatus above said flame producing means, for distributing heat produced by said flame heat source; and
   at least one handle coupled to a top of said wire rack frame, and wherein said insulation means includes at least one vent opening in a top thereof, said handle extending through said vent opening, said vent opening allowing heat from inside said apparatus to escape therethrough.

2. Apparatus according to claim 1 wherein said insulation means includes:
   a breathable fabric outer shell; and a foam insulation means coupled inside said fabric shell, for retaining heat within said fabric shell to retain heat within said apparatus.

3. Apparatus according to claim 1 wherein said insulation means includes a zippered door.

4. Apparatus according to claim 1 wherein said wire rack frame includes a plurality of horizontal support members adapted for holding food in a horizontal position within said apparatus.

5. Apparatus according to claim 1 further including a base disposed beneath said apparatus bottom.

6. Apparatus according to claim 5 wherein said base comprises a plastic material and includes a bottom and four side walls.

7. Apparatus according to claim 1 wherein said insulation means includes a door fastened with a friction hookable means.

8. Apparatus according to claim 1 wherein said insulation means includes a door fastened with snap fasteners.

9. Apparatus according claim 1 wherein said insulation means includes a door fastened with spring closure devices.

10. Warming apparatus, comprising:
enclosure means for defining a heat retention volume, said enclosure means including;
   a breathable fabric shell, said shell including a vent opening at a top of said apparatus for venting heat from said heat retention volume, and wherein said enclosure means includes a handle protruding through said vent opening;
   heat insulation means, coupled to an inside of said shell, for retaining heat within said shell; and
   door means, coupled to a portion of said shell, for providing access to said heat retention volume;
flame producing means, disposed on said bottom plate so as to transfer heat to said bottom plate, for providing a source of heat;
a heat distribution plate, disposed in said heat retention volume above said flame producing means, for distributing the heat provided by said flame producing means; and
retention means, coupled on said bottom plate, for retaining said flame producing means on said bottom plate.

11. Apparatus according to claim 10 wherein said retention means includes:
a stationary support coupled to said bottom plate;
an articulatable support, articulatably coupled to said bottom plate; and
biasing means, coupled to said articulatable support, for biasing said articulatable support toward said stationary support.

12. Apparatus according to claim 10 wherein said flame producing means includes a fuel reservoir and a wick, and wherein said retention means includes a domed device having a bottom disposed on said bottom plate and a top having a hole through which said wick protrudes.

13. Apparatus according to claim 10 wherein said enclosure means includes a wire rack frame disposed inside said heat retention volume, said wire rack frame including horizontal support means adapted for providing horizontal support to material warmed in said apparatus.

14. Apparatus according to claim 13 further including a plurality of removable wire rack shelves disposed on said horizontal support means.

15. Apparatus according to claim 10 further including an additional heat distribution plate, coupled in proximity to and substantially parallel with said heat distribution plate, for further distributing the heat provided by said flame producing means.

16. Apparatus according to claim 10, wherein said bottom plate comprises a plastic base having a bottom and four upturned edges.

17. Food warming apparatus, comprising:
a wire rack frame;
insulation means, surrounding said frame, for defining a heat retention volume, said insulation means having a vent hole at a top thereof for venting heat from said heat retention volume;
a handle coupled to a top of said wire rack frame and protruding through said vent opening;
flame producing means disposed within said heat retention volume, for providing heat;
a bottom plate disposed at a bottom of said heat retention volume, for (a) supporting said flame producing means, and (b) transferring heat away from said flame producing means;
retention means, coupled to said bottom plate, for holding said flame producing means to said bottom plate;
a heat distribution plate disposed within said volume above said flame producing means, for distributing heat produced by said flame producing means;
a plurality of horizontal support members, coupled to said wire rack frame, adapted for holding food in said heat retention volume; and
a base coupled to a bottom of said bottom plate.

18. Apparatus according to claim 17 wherein said insulation means includes:
a breathable fabric outer shell;
foam insulation bonded inside said outer shell; and
an inner fabric liner.

19. Apparatus according to claim 17 wherein said insulation means includes a zippered door for providing access to said heat retention volume.

20. Apparatus according to claim 17 wherein said retention means includes:
a stationary support member;
an articulatable support member; and biasing means for biasing said articulatable support member toward said stationary support member.

21. Apparatus according to claim 17 wherein said insulation means includes a door fastened with friction hookable means.

22. Apparatus according to claim 17 wherein said insulation means includes a door fastened with snap fasteners.

23. Apparatus according to claim 17 wherein said insulation means includes a door fastened with spring closure devices.

* * * * *